United States Patent
Chowdhary et al.

(10) Patent No.: US 10,943,602 B2
(45) Date of Patent: Mar. 9, 2021

(54) OPEN VS ENCLOSED SPATIAL ENVIRONMENT CLASSIFICATION FOR A MOBILE OR WEARABLE DEVICE USING MICROPHONE AND DEEP LEARNING METHOD

(71) Applicants: STMicroelectronics, Inc., Coppell, TX (US); STMicroelectronics International N.V., Geneva (CH)

(72) Inventors: Mahesh Chowdhary, San Jose, CA (US); Arun Kumar, New Delhi (IN); Ghanapriya Singh, New Delhi (IN); Rajendar Bahl, Gurugram (IN)

(73) Assignees: STmicroelectronics International N.V., Geneva (CH); STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 16/696,948

(22) Filed: Nov. 26, 2019

(65) Prior Publication Data
US 2020/0219528 A1 Jul. 9, 2020

Related U.S. Application Data

(60) Provisional application No. 62/789,406, filed on Jan. 7, 2019.

(51) Int. Cl.
*H04R 3/00* (2006.01)
*G10L 25/51* (2013.01)
(Continued)

(52) U.S. Cl.
CPC .............. *G10L 25/51* (2013.01); *G10L 25/21* (2013.01); *G10L 25/24* (2013.01); *H04R 1/406* (2013.01); *H04R 3/005* (2013.01)

(58) Field of Classification Search
CPC . H04R 3/00; H04R 3/005; H04R 1/40; H04R 1/406; G10L 25/21; G10L 25/24;
(Continued)

(56) References Cited

U.S. PATENT DOCUMENTS

| 8,660,581 B2 | 2/2014 | Davis et al. |
| 2013/0070928 A1 | 3/2013 | Ellis et al. |

(Continued)

OTHER PUBLICATIONS

Alsina-Pagès et al., "homeSound: Real-Time Audio Event Detection Based on High Performance Computing for Behaviour and Surveillance Remote Monitoring," *Sensors* 17:854, 2017. (22 pages).

(Continued)

*Primary Examiner* — Thang V Tran
(74) *Attorney, Agent, or Firm* — Seed IP Law Group LLP

(57) ABSTRACT

A method and apparatus for classifying a spatial environment as open or enclosed are provided. In the method and apparatus, one or more microphones detect ambient sound in a spatial environment and output an audio signal representative of the ambient sound. A processor determines a spatial environment impulse response (SEIR) for the audio signal and extracts one or more features of the SEIR. The processor classifies the spatial environment as open or enclosed based on the one or more features of the SEIR.

20 Claims, 9 Drawing Sheets

(51) Int. Cl.
*G10L 25/21* (2013.01)
*G10L 25/24* (2013.01)
*H04R 1/40* (2006.01)

(58) Field of Classification Search
CPC ........... G10L 25/48; G10L 25/51; H04S 7/00; H04W 4/025; H04W 4/029; H04W 4/30; H04W 4/33
See application file for complete search history.

(56) References Cited

U.S. PATENT DOCUMENTS

| | | | |
|---|---|---|---|
| 2014/0142958 A1 | 5/2014 | Sharma et al. | |
| 2016/0091604 A1* | 3/2016 | Chen | G01S 15/04 367/93 |
| 2016/0363914 A1* | 12/2016 | Kim | G06F 3/016 |
| 2017/0094471 A1* | 3/2017 | Sendonaris | H04W 4/025 |

OTHER PUBLICATIONS

Ganchev et al., "Comparative Evaluation of Various MFCC Implementations on the Speaker Verification Task," *Proc. of the SPECOM-2005*, Oct. 17-19, 2005, Patras, Greece, pp. 191-194.
Kumar et al., "Delta-Spectral Cepstral Coefficients for Robust Speech Recognition," 2011 IEEE International Conference on Acoustics, Speech and Signal Processing, May 22-27, 2011, 4 pages.
Mascia, et al., "Forensic and Anti-Forensic Analysis of Indoor/Outdoor Classifiers Based on Acoustic Clues," *23rd European Signal Processing Conference (EUSIPCO)*, 2015, pp. 2072-2076.
Murgai, et al., "Blind Estimation of the Reverberation Fingerprint of Unknown Acoustic Environments," *Audio Engineering Society Convention*, 2017, pp. 6.
Shabtai, et al., "Room Volume Classification from Reverberant Speech," *Proc. of Int'l Workshop on Acoustics Signal Enhancement*, 2010, pp. 4.
Shah, et al., "Inferring Room Semantics Using Acoustic Monitoring ," *IEEE 27th International Workshop on Machine Learning for Signal Processing (MLSP)*, 2017, pp. 6.

* cited by examiner

| Features | Testing accuracy of open vs. enclosed spatial environment (%) |
|---|---|
| SEIR only (9D) | 78.5 |
| MFCC (13D) (5 frames concatenation 13*5=65D) | 79.3 |
| MFCC (13D), delta MFCC (13D) & double delta MFCC (13D) (5 frames concatenation 39*5=195D) | 96.3 |
| SEIR & MFCC (9D+14*5=79D) | 99.9 |

FIG. 9

OPEN VS ENCLOSED SPATIAL ENVIRONMENT CLASSIFICATION FOR A MOBILE OR WEARABLE DEVICE USING MICROPHONE AND DEEP LEARNING METHOD

BACKGROUND

Technical Field

The present disclosure generally relates to a method for open or enclosed spatial environment classification for a mobile or wearable device, and, in particular, the present disclosure relates to a method for classification using passively recorded sound.

Description of the Related Art

Modern consumer electronics devices, such as mobile phones, wearable devices or personal digital assistants, are typically equipped with a built-in high fidelity digital microphone or an array of microphones that input sound for communication or voice instructions. A consumer electronics device is typically equipped with a processor having the capability to perform complex computations. This allows use of the device in performing computationally intensive operations on sound digitally recorded using the microphone or microphone array and gleaning information from sound recordings.

BRIEF SUMMARY

Provided is a method and device for classifying open or enclosed spatial environments of a space in a proximity of the device. The device may be a mobile or wearable device, among others. The device retrieves sound signals in the environment using a microphone or an array of microphones without actively sending any known signal through a speaker. The device estimates a Spatial Environment Impulse Response (SEIR) from passively recorded ambient sound present in the spatial environment thereby forgoing active audio transmissions.

The device extracts features from the SEIR. The device augments the features extracted from the SEIR with additional features, such as Mel-Frequency Cepstral Coefficients (MFCCs), delta MFCCs and double delta MFCCs of the sound signal. Different frame sizes of the digitized microphone signal are used for extracting features derived from SEIR and the MFCCs, delta MFCCs and double delta MFCCs features. The device concatenates the features and provides the features to a pattern classifier (e.g., a deep learning classifier) to classify the spatial environment as open or enclosed.

BRIEF DESCRIPTION OF THE SEVERAL VIEWS OF THE DRAWINGS

FIG. 9 shows an example of the testing accuracy of a DNN classifier.

DETAILED DESCRIPTION

Provided herein are techniques for identifying the spatial environment surrounding a device as open or enclosed without explicit input from a user. Accurate classification of the spatial environment of a mobile or wearable device is a useful contextual input for various context-aware applications.

The classification of open or enclosed spatial environment of the mobile or wearable device user has been attempted with various other sensors such as Global Positioning System (GPS), Indoor Positioning System (IPS), Wi-Fi, Radio Frequency (RF) ranging, mobile network, Radio access network (RAN), camera, loudspeaker, and microphone(s), among others. However, these techniques have their associated limitations. For example, Wi-Fi infrastructure and mobile network availability is not universal and GPS signals may have ambiguities due to the accuracy of position and signal strength-based detection. In addition, separate hardware is required for IPS, Wi-Fi and RAN-based classification.

The use of a camera for classifying the spatial environment depends on ambient lighting, increases power usage and may raise privacy concerns. In addition, spatial environment classification using active test signals relies on echoes of actively transmitted signals reflected by objects in the environment, which introduces noise in the environment.

To classify the spatial environment of a device, a Spatial Environment Impulse Response (SEIR) is estimated using ambient sound signals received by a microphone or an array of microphones without explicitly outputting a known test signal. The device extracts novel features from the SEIR. The device may augment the features of the SEIR with other features such as the Mel-Frequency Cepstral Coefficients (MFCCs), delta MFCCs and double delta MFCCs from the microphone signal. The features are input into a pattern classifier, such as a deep learning architecture, for classifying spatial environment as open or enclosed.

Figure 1:
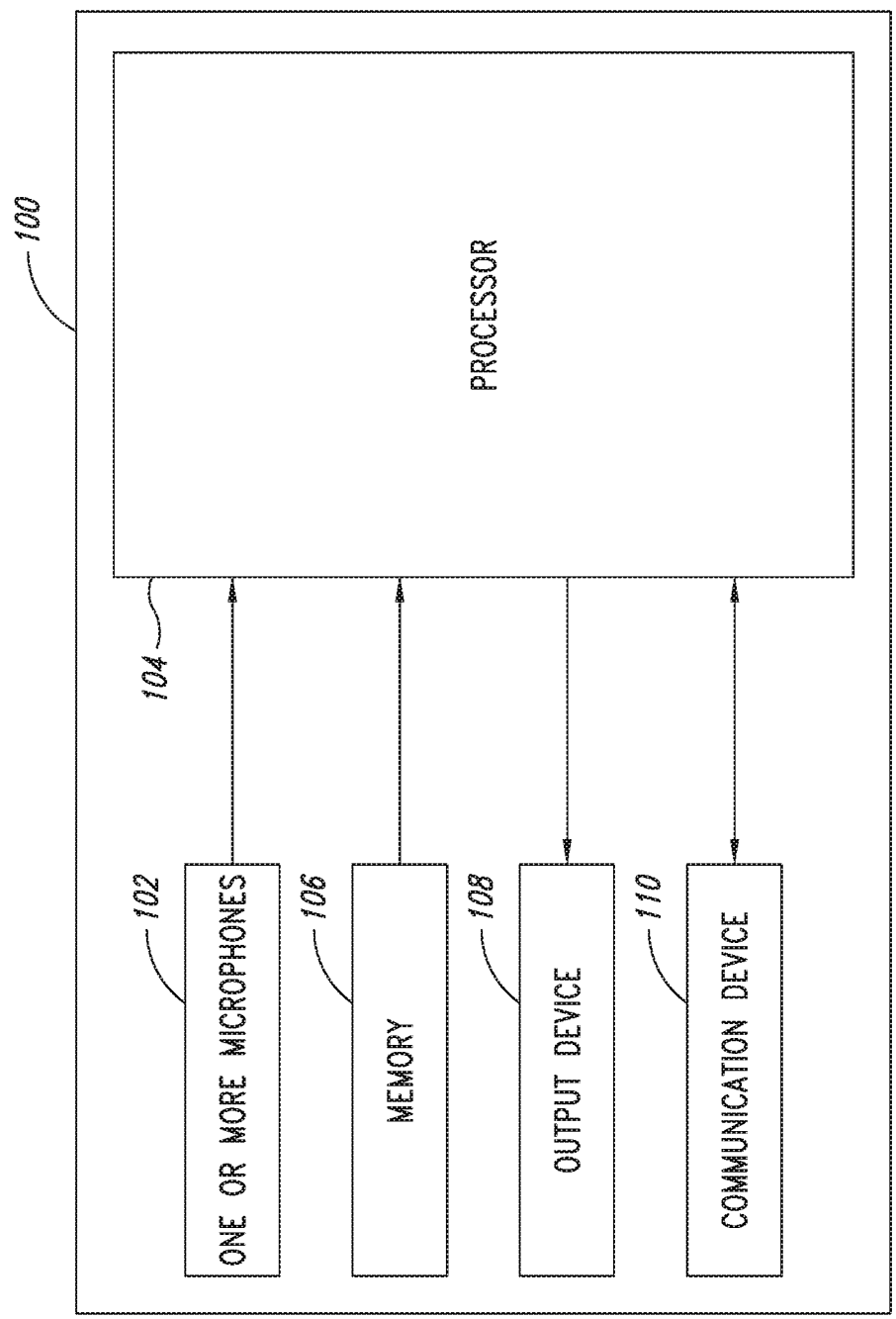
FIG. 1 shows a block diagram of a device for classifying a spatial environment.

FIG. 1 shows a block diagram of a device 100 for classifying a spatial environment. The device 100 may be a mobile or wearable device, among others. The device 100 may be a smartphone, a smartwatch, a personal digital assistant (PDA) or a portable audio or speech signal recorder, among others. The device 100 includes one or more microphones 102, a processor 104, memory 106, an output device 108 and a communication device 110.

The device 100 determines whether a surrounding environment is an open or enclosed spatial environment. The device 100 may determine whether the spatial environment is an open space or enclosed space without actively transmitting an audio signal into the environment as described herein.

The one or more microphones 102 may be a single microphone or a plurality of microphones spaced apart from each other with an inter-microphone spacing therebetween. The plurality of microphones may have any geometry, such as linear, planar or cubic, among others. The plurality of microphones may have equidistant or non-equidistant spacing. The one or more microphones 102 may directionally or omni-directionally capture audio (for example, raw audio) in their proximity or surroundings. The one or more microphones 102 may output data representative of the captured audio to the processor 104. The one or more microphones 102 may have a directionality, sensitivity, signal-to-noise ratio (SNR) response, or frequency response that is sufficient to capture audio usable to identify a type of the spatial environment.

The processor 104 may be any type of device configured to execute executable instructions stored in the memory 106. When the executable instructions are executed by the processor 104, the executable instructions cause the processor 104 to perform the functions or techniques described herein. The processor 104 may be a controller, a microcontroller or a microprocessor, among others, and may include an arithmetic and logic unit (ALU), among other computational units. The processor 104 may perform the techniques described herein. The processor 104 may be an embedded system-on-chip (SoC). The processor 104 may include a central processing unit (CPU) or graphics processing unit (GPU), among others. The processor 104 may perform numerical computations to classify open or enclosed spatial environment of the device 100 or user thereof. The processor 104 receives the data representative of the captured audio from the one or more microphones 102. The processor 104 processes the data and executes algorithmic computations on the data and classifies a spatial environment of the device 100 as open or enclosed. In an embodiment, the processor 104 may send the data representative of the captured raw audio to another device or processor for executing the techniques described herein.

The processor 104 may initially perform pre-processing on the data. Then the processor 104 may perform windowing and/or data framing on the pre-processed data. A frame size may be selected depending on the features sought to be derived from the pre-processed data. The processor 104 then estimates a Spatial Environment Impulse Response (SEIR) for the spatial environment and derives features therefrom. The processor 104 may augment the features derived from SEIR with other features to form a composite feature vector.

The processor 104 may then perform spatial environment classification based on the composite feature vector or features thereof. The processor 104 obtains a supervised classification of an open or enclosed spatial environment of the device 100. The processor 104 acquires trained model parameters that are apriori known. For example, a pattern library including model parameters may be stored in the memory 106 or another device, such as a server. The device 110 may communicate with the server using the communication device 110 and may acquire the model parameters from the server. Further, the device 100 may store the model parameters, which may be factory set, on an external or expandable memory. After performing spatial environment classification, the processor 104 may perform post-processing on the output of spatial environment classification.

The memory 106 may be any non-transitory computer-readable storage medium. The memory 106 may be configured to store executable instructions that, when executed by the processor 104, cause the processor 104 to perform the operations, methods or techniques described herein. The executable instructions may be a computer program or code. The memory 106 may include a random access memory (RAM) and/or a read-only memory (ROM). The memory 106 may store executable instructions that cause the processor 104 to receive the data representative of the captured audio from the one or more microphones 102, pre-process the data, perform windowing and/or data framing on the pre-processed data, estimate an SEIR for the spatial environment, derive features from the SEIR, augment the features derived from SEIR with other features, perform spatial environment classification and perform post-processing on the output of spatial environment classification, among others.

The processor 104 may store the spatial environment classification, transmit the spatial environment classification, using the communication device 110, to another device or output the spatial environment classification to a user. For example, the processor 104 may store the classification for use by a context-aware application running on the device or output the classification for use by a context-aware application.

The output device 108 may be any type of device configured to output data to a user. For example, the output device 108 may be a display or a speaker, among others. The output device 108 may output, to a user, a result of the spatial environment classification, among other information.

The communication device 110 may be any type of device that is operable to communicate with another device. The communication device 110 may be a transmitter, receiver, transceiver or modem, among others. The communication device 110 may be configured to communicate using any type of communication protocol. The protocol may be a cellular communication protocol, such as long term evolution (LTE), or a wireless communication protocol, such as the Institute of Electrical and Electronics Engineers (IEEE) 802 protocol, among others. The device 100 may communicate with a server over the communication device 110.

Figure 2:
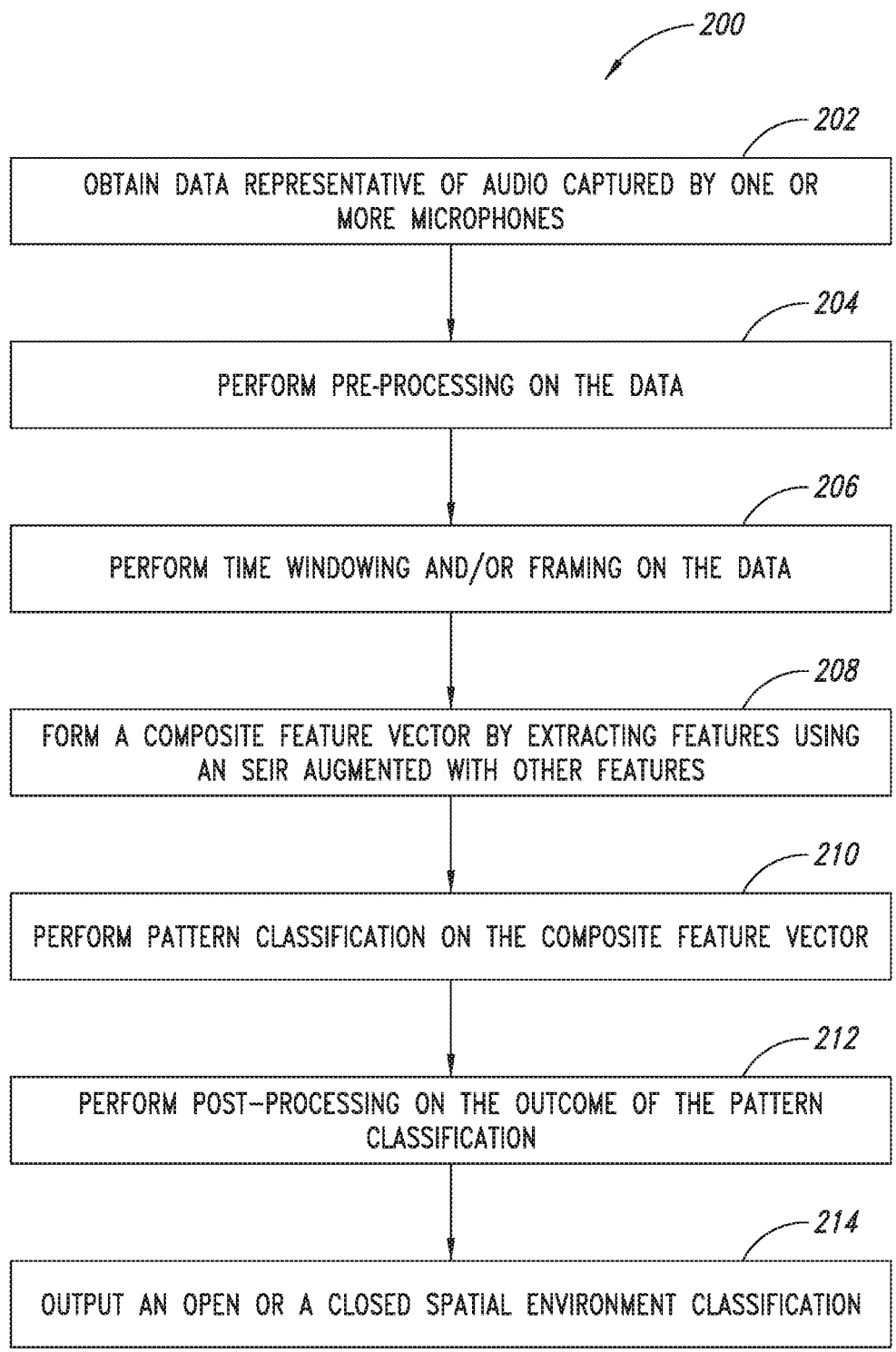
FIG. 2 shows a flow diagram of a method for spatial environment classification.

FIG. 2 shows a flow diagram of a method 200 for spatial environment classification. As described herein, the method 200 may be used to determine whether the device 100 is in an open or enclosed spatial environment. The method relies on microphone audio capture and deep learning. In the method 200, the device 100 obtains data representative of audio captured by the one or more microphones 102 at 202. The data may be a function of time. At 204, the device 100 (or the processor 104 thereof) performs pre-processing on the data. The pre-processing may include filtering the data for signal enhancement and down-sampling of the data (or signals represented by the data.

At 206, the device 100 performs time windowing and/or framing on the data. At 208, the device 100 forms a composite feature vector by extracting features using an SEIR that is augmented with other features. The device 100 may augment the SEIR with a Mel-Frequency Cepstral Coefficients (MFCC), a delta MFCC or a double delta MFCC to form the composite feature vector. The device 100 performs pattern classification on the composite feature vector at 210. Pattern classification may be a deep learning classification and may be supervised. As such, the device 100 may use a pattern library having model parameters to perform the pattern classification.

The model parameters may be available a priori and may be trained based on a database composed of observations. The observations may have wide variability to facilitate classification. For example, for open spatial environments, the database may include model parameters for a beach, stadium, street and/or nature, and for closed environment, the database may include model parameters for a mall, office and/or home. A pattern library with model parameters may be stored in a server or by the device 100 as described herein. Prior to performing the pattern classification on the composite feature vector, the device may access the pattern library to obtain the model parameters of various open and closed special environments. The device 100 then performs the pattern classification based on the composite feature vector and the pattern library.

After performing the pattern classification, the device 100, at 212, performs post-processing on the outcome of pattern classification. Post-processing may include median filtering the output of pattern classification. At 214, the device 100 outputs an open or a closed spatial environment classification.

Figure 3:
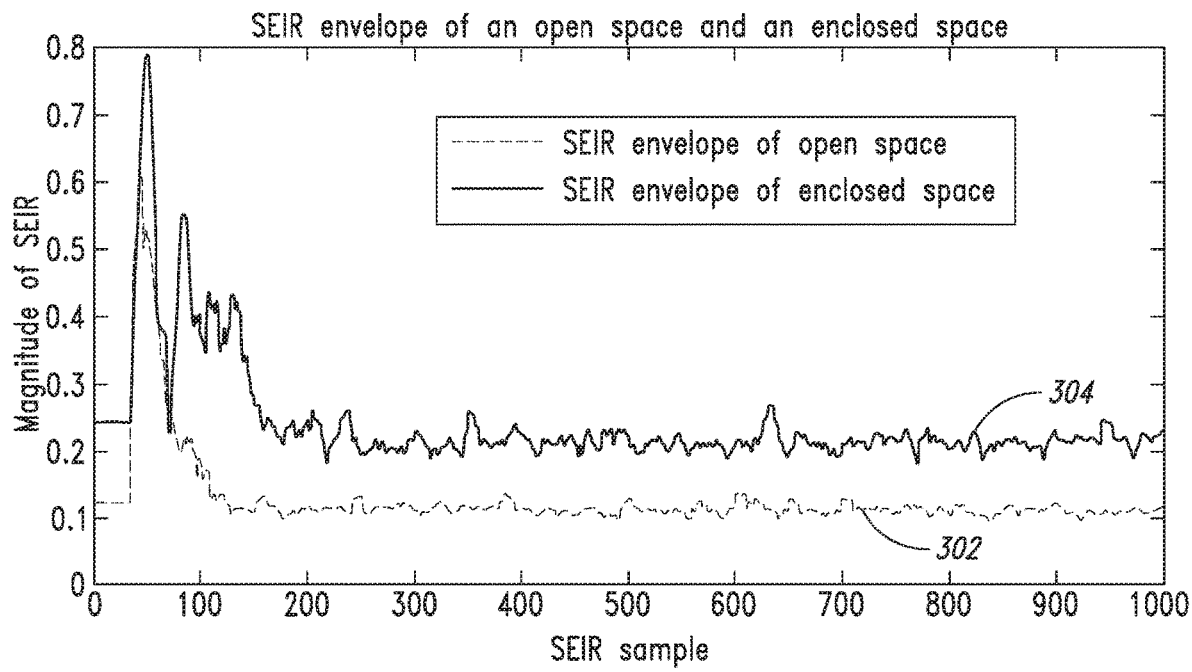
FIG. 3 shows an example of a Spatial Environment Impulse Response (SEIR) envelope for an open space and an example SEIR envelope for an enclosed space.

FIG. 3 shows an example SEIR envelope for an open space 302 and an example SEIR envelope for an enclosed space 304. The SEIR envelopes 302, 304 may be signatures that are representative of the temporal envelopes of the open and enclosed spatial environments, respectively. The SEIR envelopes 302, 304 of the open and enclosed spatial environments have different characteristics. Whereas the SEIR envelope of the enclosed spatial environment 304 has multiple reflections and reverberations, the SEIR envelope of the open spatial environment 302 includes a signature associated with a direct arrival of sound from a source to the microphone without subsequent reflections or reverberations. The different features of the SEIR envelope are used to classify the spatial environment of the device 100 as open or enclosed.

Figure 4:
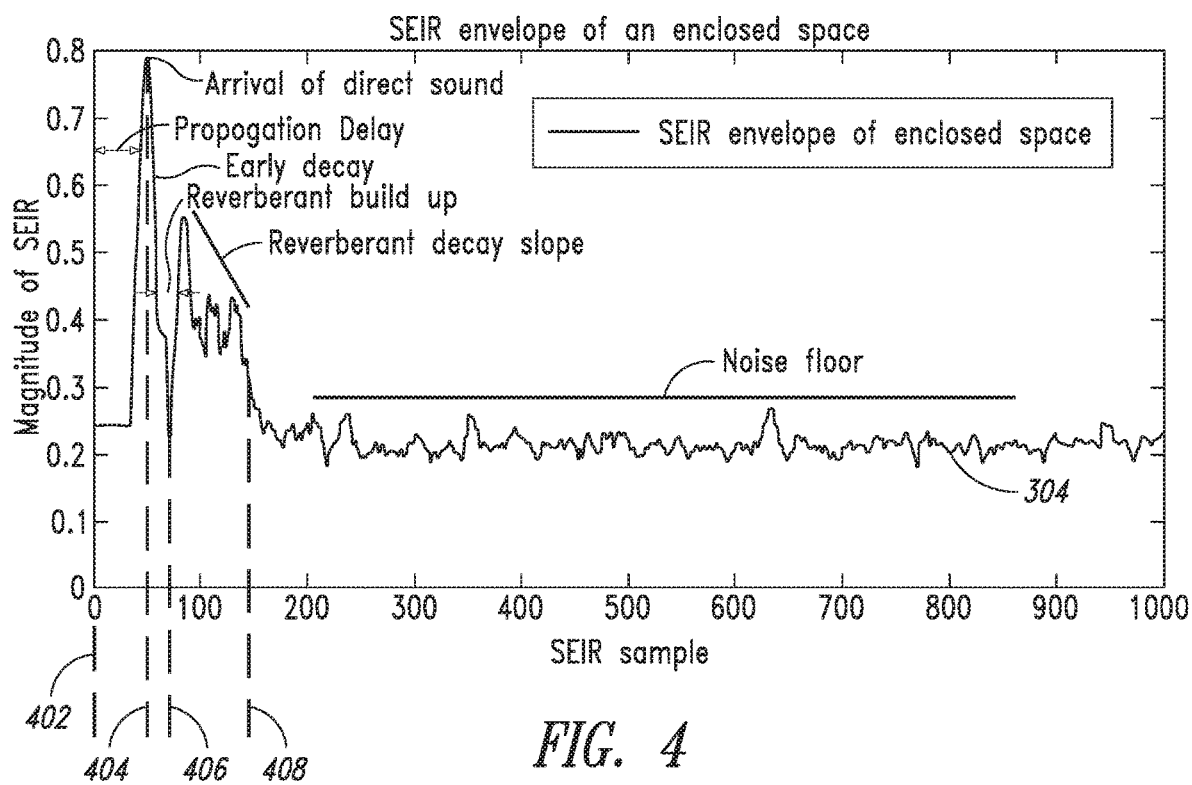
FIG. 4 illustrates details of the SEIR envelope for the enclosed space.

FIG. 4 illustrates details of the SEIR envelope for the enclosed space 304. A sound signal (or a pulse) is initially produced at a first time instance 402. After a period of a propagation delay, which represents a time taken by the sound signal to travel from a source to the one or more microphones 102, the sound signal arrives at the one or more microphones 102 at a second time instance 404. The direct and non-reverberated arrival of sound from at the one or more microphones 102 results in a maximum peak of the SEIR envelope. The magnitude of the SEIR magnitude then decays until a third time instance 406. After the third time instance 406, reverberations, which are high density late reflections of the sound signal, arrive at the one or more microphones 102. The reverberations each build up to a local maximum. The reverberations occur with decreasing amplitude over time until a fourth time instance 408. The reverberations decay is associated with a decay slope that may be used as a representative feature of the SEIR. After the fourth time instance 408, the SEIR envelope 304 exhibits a noise floor.

The SEIR envelope of the enclosed spatial environment is characterized by the reverberations, which may be the result of reflections from walls or other structures. The reverberations distinctly identify the SEIR envelope of the enclosed spatial environment and are typically absent from the SEIR envelopes of open spatial environments due to the fact that open spatial environments have fewer structures that reflect sound.

To measure an impulse response of an acoustical system, a known input test signal may be transmitted and a system output may be measured. The system output may be deconvoluted in relation to the input test signal to obtain the impulse response. The input signal (or excitation signal) may be suitably chosen and the deconvolution method may be linear or circular.

Described herein are techniques for passively extracting the SEIR based on a recorded ambient sound signal. The ambient sound signal may be naturally generated in the environment as opposed to being a reflection of a transmitted excitation signal. Blind deconvolution is used herein to estimate the SEIR envelope of the spatial environment.

Figure 5:
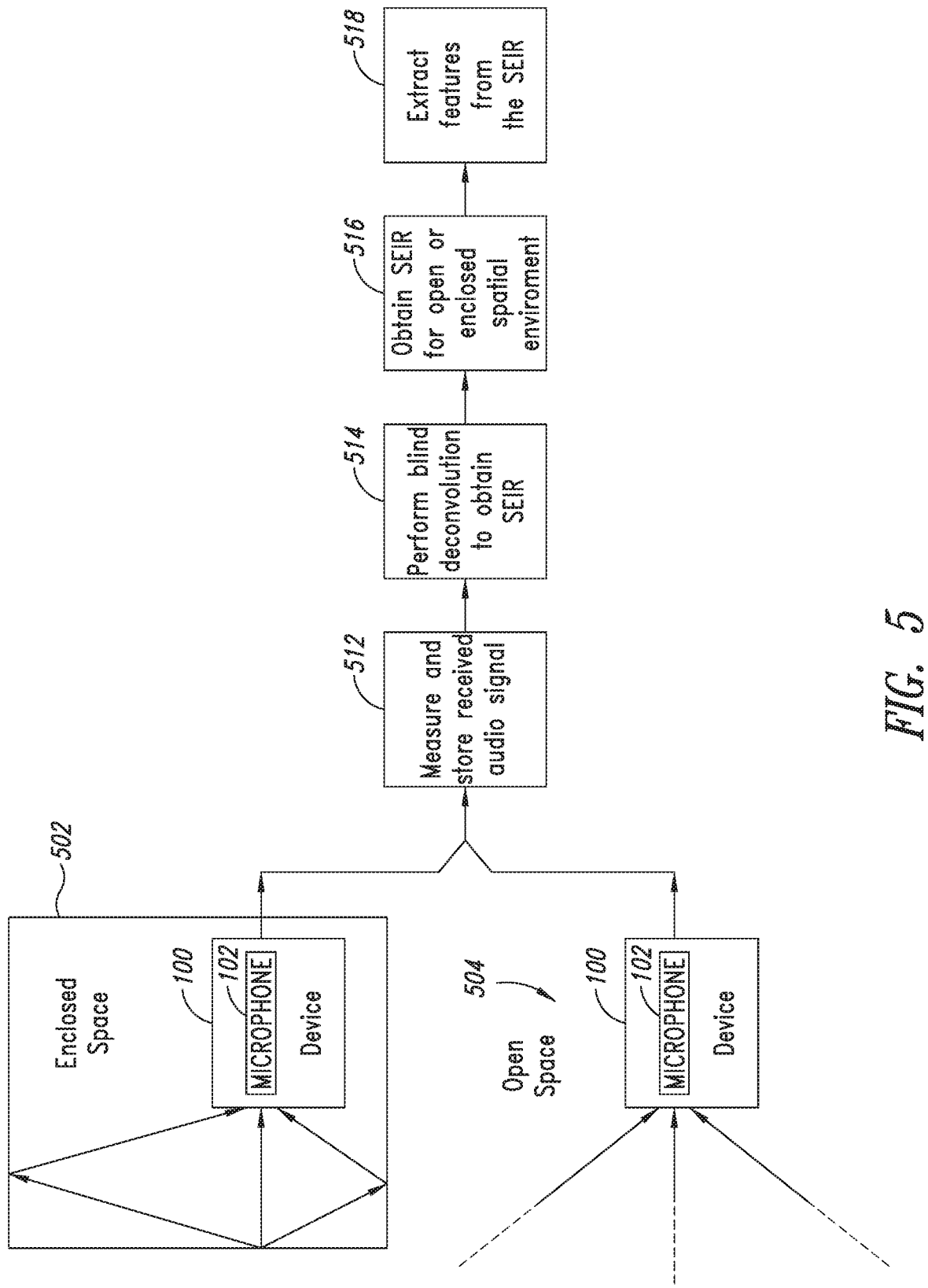
FIG. 5 shows a technique for SEIR estimation and feature extraction for open and enclosed spatial environments classification using ambient sound present in the spatial environments.

FIG. 5 shows a technique for SEIR estimation and feature extraction for open and enclosed spatial environments classification using ambient sound present in the spatial environments. At separate times, the device 100 may be positioned in an enclosed spatial environment 502 and in an open spatial environment 504. At 512, the device 100 measures, using the one or more microphones 102, a sound signal in the enclosed and open spatial environments 502, 504 and stores the sound signal. At 514, the device 100 performs blind deconvolution on the audio signal. At 516, the device 100 obtains the SEIR for an open or enclosed spatial environment. The device 100 extracts features from the SEIR at 518 and classifies the environment as open or enclosed.

Figure 6:
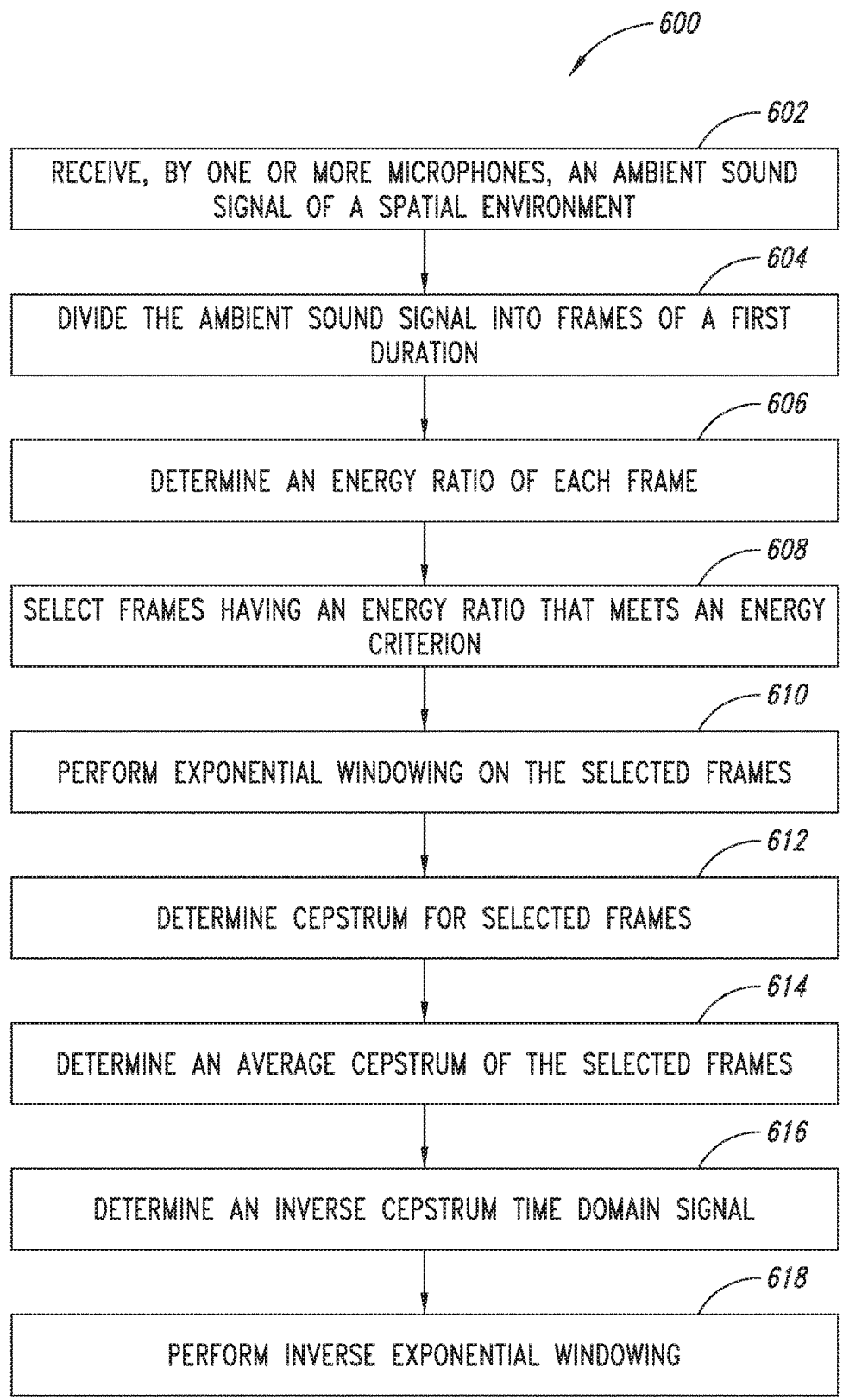
FIG. 6 shows a flow diagram of a method for estimating an SEIR from ambient sound of a spatial environment.

FIG. 6 shows a flow diagram of a method for estimating a Spatial Environment Impulse Response (SEIR) from ambient sound of a spatial environment. The one or more microphones 102 receive an ambient sound signal of a spatial environment at 602. The one or more microphones 102 may output data representative of the ambient sound to the processor 104. At 604, the processor 104 divides the ambient sound signal into frames of a first duration (denoted '$t_1$'). The frames may have an overlap of a first overlap duration (denoted '$\Delta t_1$') with each other. At 606, the processor 104 determines an energy ratio of each frame. Determining the energy ratio may be performed by calculating a ratio between an energy of a frame and an energy of a preceding frame, whereby the preceding frame may immediately precede the frame.

At 608, the processor 104 selects frames having an energy ratio that meets an energy criterion. For example, the processor 104 may select frames having an energy ratio that exceeds a threshold. Reverberant tails due to excitation prior to the beginning of a frame may have residuals in a subsequent frame. Accordingly, it is desirable to select frames having a relatively high energy. For example, the processor 104 may select frames in the upper 25th percentile of a distribution of frame energy ratios.

The processor 104 performs exponential windowing on the selected frames at 610. After the exponential windowing, the processor 104 determines a cepstrum for the selected frames. The exponential windowing moves all poles and zeroes of the frame inside the unit circle in the z-plane. The cepstrum generally requires a signal that is minimum-phase. Due to the fact that spatial environment impulse responses are generally mixed-phase having some zeros that lie within the unit circle and others that lie outside the unit circle, it may be desirable to perform the windowing to move all poles and zeroes of the frame inside the unit circle. A minimum phase signal is advantageous due to the fact that it has an unambiguous linear phase due to which phase unwrapping is not required. After the exponential windowing, the processor 104 determines a cepstrum for the selected frames at 612. The cepstrum (denoted '$c(n)$') for a frame is determined as:

$$c(n)=IDFT(\log(DFT(y(n)))), \quad \text{Equation (1)}$$

where $y(n)$ denotes the frame, DFT denotes a discrete Fourier transform operation, log denotes a logarithm and IDFT denotes an inverse discrete Fourier transform operation.

The processor 104 determines an average cepstrum of the selected frames at 614. Averaging the cepstral reduces the effect of a background cepstral level of the frames. The processor 104 may determine the average cepstrum over a second duration (denoted '$t_2$'). The processor 104 obtains an inverse cepstrum time domain signal at 616. The processor 104 may obtain the inverse cepstrum as:

$$h(n)=IDFT(\exp(DFT(c(n)))), \quad \text{Equation (2)}$$

where exp denotes an exponential operation.

After the cepstral operations, the processor 104 performs inverse exponential windowing at 618 to move the poles and zeros back to their respective locations. Performing the inverse exponential windowing may include multiplying each window by a decaying exponential. This does not introduce distortion in the convolution relationship. Thus, the SEIR (h(n)) is obtained over the second duration.

In an embodiment, the first duration of the frame size may be 500 milliseconds (ms) and the first overlap duration ($\Delta t_1$) may be a 90% overlap. Further, the sampling frequency may be set to 16 kilohertz (kHz). The ambient sound signal may have a duration of 60 seconds and the exponential window function may be represented as:

$$w(n)=\exp(-n/c), \quad \text{Equation (3)}$$

where c is a constant determined as one fifth of the first duration of the frame (or 0.1). The SEIR may include information about energy decay and the absolute value of an amplitude of the SEIR may be determined. Further, the cepstrum may be averaged over a duration of 60 seconds and the SEIR (h(n)) may also be estimated over 60 seconds.

Figure 7:
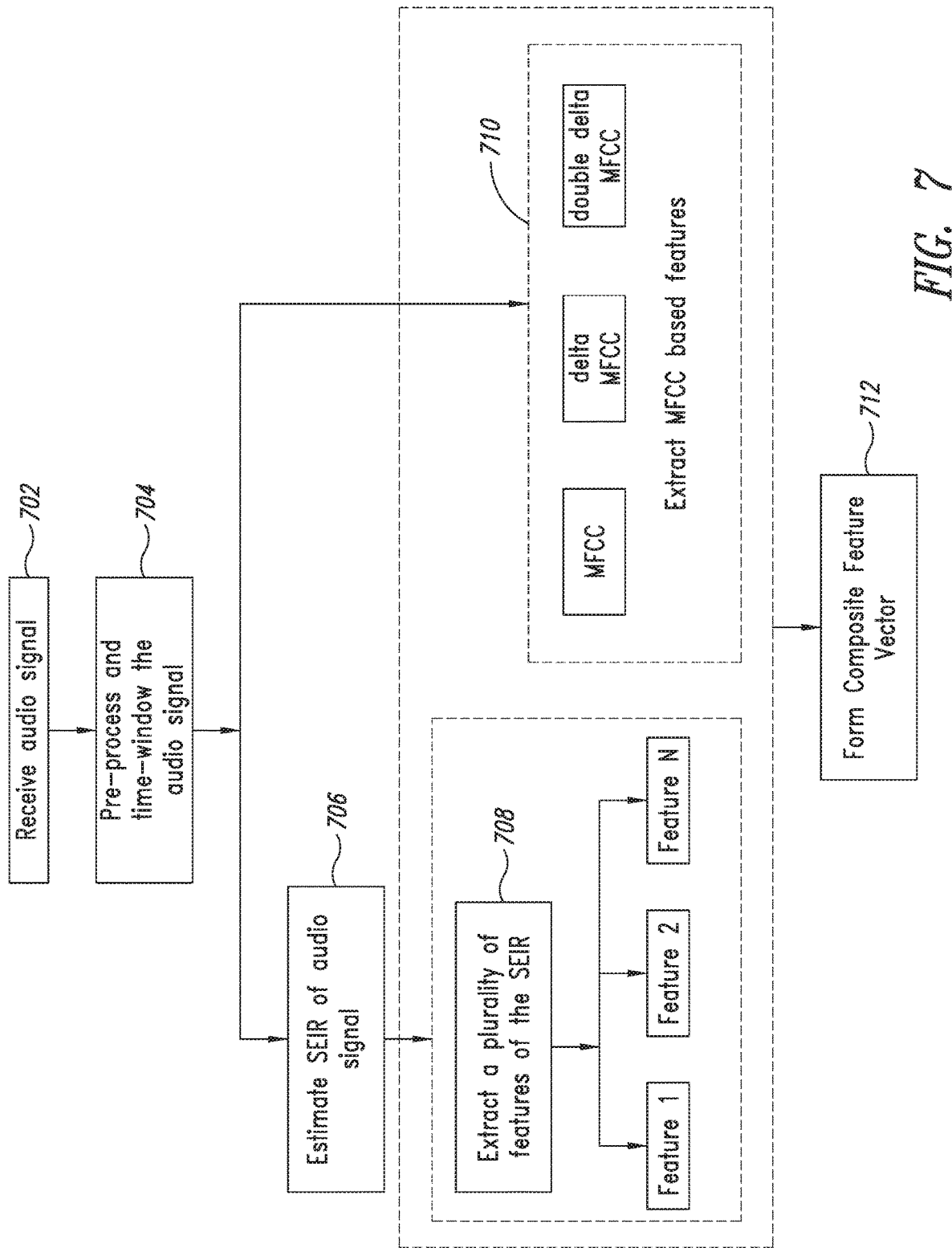
FIG. 7 shows a flow diagram of a method for generating a composite feature vector by augmenting feature vectors derived from signal windows.

FIG. 7 shows a flow diagram of a method for generating a composite feature vector by augmenting feature vectors derived from signal windows. The signal windows may have different durations. At 702, the device 100 captures an audio signal. As described herein, the audio signal may be an ambient sound signal of a spatial environment and may be received by the one or more microphones 102. The one or more microphones 102 may output data representative of the audio signal to the processor 104. The processor 104 pre-processes and time-windows the audio signal at 704.

At 706, the processor 104 estimate the SEIR of the audio signal as described herein. The processor 104 may choose frames that satisfy the energy ratio criterion and may time-window the chosen frames for computing the cepstrum. The time-window may have a first duration ($t_1$) of 500 ms. The processor 104 then averages the cepstrum over a second duration to obtain the SEIR.

At 708, the processor 104 extracts a plurality of features of the SEIR. The plurality of features may have a first number (denoted 'N'). The processor 104 extracts the plurality of features over a time window having the second duration to obtain an N-dimensional feature vector for a duration of audio signal equaling the second duration.

At 710, the processor 104 extracts MFCC-based features from the audio signal. For MFCC-based feature extraction, the audio signal may be time-windowed and framed using a different duration than for SEIR feature extraction. For MFCC-based feature extraction, the audio signal may be time-windowed with a third duration (denoted '$t_3$') different than the second duration. Extracting MFCC-based features from the audio signal may include extracting features based on an MFCC, delta MFCC or double delta MFCC. The processor 104, at 712, forms a composite vector by augmenting the plurality of features extracted from the SEIR over the second duration with the MFCC-based features extracted over the third duration. The processor 104 may concatenate the features extracted over the different time window durations to produce a composite feature vector.

Figure 8A:
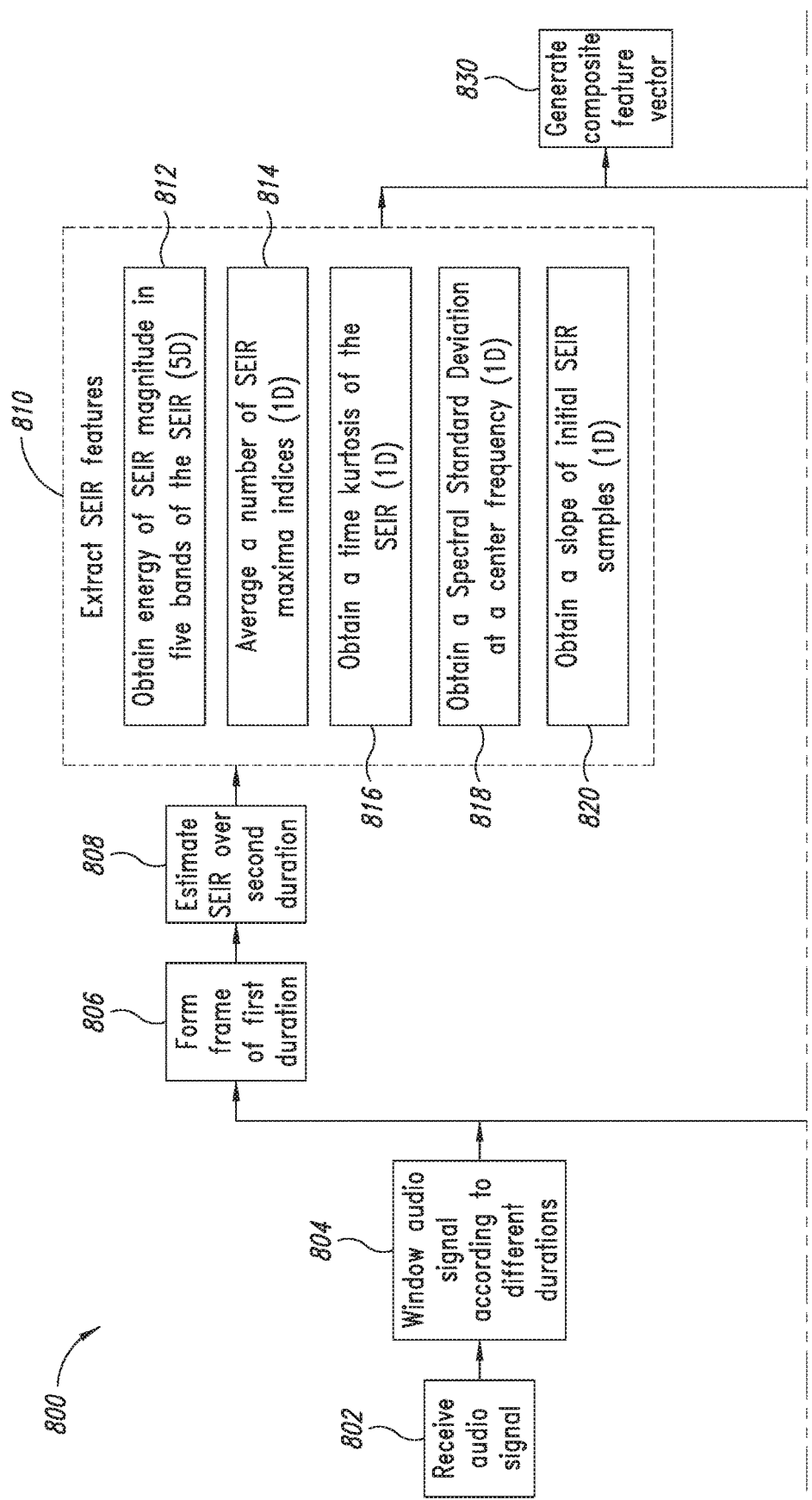
FIGS. 8A and 8B show a flow diagram of a method for concatenating feature vectors of different dimensions to form a composite feature vector.
Figure 8B:
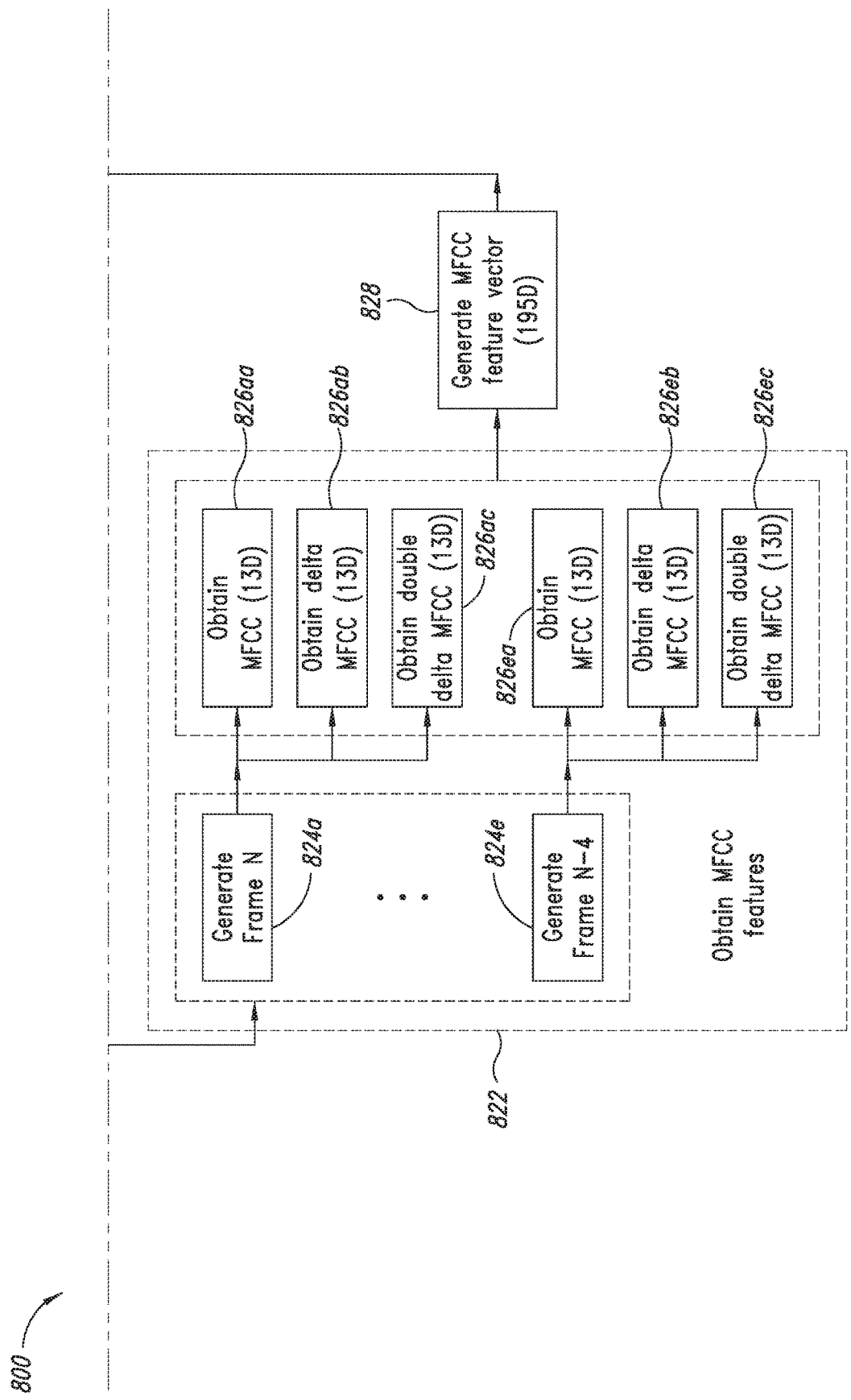

FIGS. 8A and 8B show a flow diagram of a method for concatenating feature vectors of different dimensions to form a composite feature vector. At 802, the device 100 receives an audio signal. The device 100 or processor 104 thereof, at 804, performs windowing on the audio signal according to different durations. As described herein, each windowed audio signal may include overlapping frames, respectively. The audio signal used for SEIR feature extraction may be windowed according to a first duration and the audio signal used for MFCC-based feature extraction may be windowed according to a third duration as described herein.

For SEIR feature extraction, the device 100 forms a frame having a first time duration at 806 and estimates, at 808, the SEIR as described herein over a second duration. The second duration may be 60 seconds, among other durations. The cepstrum-based blind deconvolution used for estimating the SEIR may locate the time origin of impulses and their relative amplitudes may also be preserved. Based on estimating the SEIR for different spatial environments it has seen observed that the cepstrum-based blind deconvolution for the SEIR includes initial strong reflections of the true SEIR up to approximately 100 ms.

In the method 800, an SEIR of 1000 samples corresponding to 62.5 ms is obtained at 16 kHz sampling rate of the audio signal is assumed. At 810, the processor 104 extracts features from the SEIR that are useful in classifying the spatial environment of the device 100 as open or enclosed. Before feature extraction, the SEIR may be passed through a moving average filter having an order of approximately 10.

In the example of FIGS. 8A and 8B, thirteen features are extracted from the SEIR to compose to a 13-dimension vector. At 812, the processor 104 obtains an energy of the SEIR magnitude in five bands of the SEIR to form a five-dimensional vector. The energy of the SEIR magnitude in the five bands of the SEIR may be obtained as follows:

$$E_1 = \frac{1}{200}\sum_{k=41}^{240} h(k)^2, \quad \text{Equation (4)}$$

$$E_2 = \frac{1}{160}\sum_{k=241}^{400} h(k)^2,$$

$$E_3 = \frac{1}{200}\sum_{k=401}^{600} h(k)^2,$$

$$E_4 = \frac{1}{200}\sum_{k=601}^{800} h(k)^2,$$

$$E_5 = \frac{1}{200}\sum_{k=801}^{1000} h(k)^2$$

The processor 104 at 814 averages a number of maxima indices of the SEIR to produce one feature. The averaged maxima indices may be the first ten maxima indices of the SEIR magnitude. At 816, the processor 104 obtains a time kurtosis of the SEIR to produce one feature. The time kurtosis of the SEIR may be obtained as:

$$\text{Kurtosis }(h(n)) = \frac{E[(h(n)-\mu)^4]}{\sigma^4} \quad \text{Equation (5)}$$

where μ is the average of the SEIR and σ is the standard deviation of the SEIR.

At 818, the processor 104 obtains a Spectral Standard Deviation (SSD) at center frequency to obtain a one-dimensional feature of the SEIR. The center frequency (fc) may be 500 Hz for a 1000-sample SEIR. The processor 104 may determine the SSD as:

$$SDD_{[f1,f2]}[H(f)] = E_{[f1,f2]}[H^2(f)] - E_{[f1,f2]}^2[H(f)], \quad \text{Equation (6)}$$

where H(f) denotes the Fourier transform of the SEIR and $E_{[f1,f2]}$ denotes the mean of the argument over the frequency band ranging from a first frequency (f1) to a second frequency (f2). The first and second frequencies may be set to $f1=fc*(2^{0.5})$ and $f2=fc/(2^{0.5})$, respectively.

At 820, the processor 104 obtains a slope of initial SEIR samples (1-dimensional feature). The processor 104 determines the slope by obtaining a maximum signal value. The maximum signal value may be a maximum magnitude of a short interval of initial samples of the SEIR. For example, the interval of initial samples may be the first 40 to 120 samples of the SEIR. The processor 104 may determine the slope as the difference between the maximum signal value and the maximum magnitude of the short interval of initial samples.

At 822, the processor obtains MFCC features for use in augmenting with SEIR features for classification. The MFCC features may include features of a delta MFCC and double delta MFCC. Different window sizes may be used for the SEIR features and MFCC features. For example, the time windowing duration (third duration $t_3$) may be 500 ms. The MFCC, delta MFCC and double delta MFCC may be determined for a 500 ms frame size with 50% overlap between successive frames.

The processor 104, at 824a-e obtains five frames, and for each frame, the processor 104, at 826aa-ec, obtains 13-dimensional MFCC features, 13-dimensional delta MFCC features and 13-dimensional double delta MFCC features. Thus, 39-dimensional features are obtained from each frame. At 828, the processor 104 generates an MFCC feature vector by concatenating features from the five successive frames for improved classification. At 830, the processor 104 generates a composite feature vector. The processor 104 may generate the composite feature vector by concatenating the SEIR features (nine features or dimensions) with the MFCC-based features (195 features or dimensions).

MFCCs, delta MFCCs and double delta MFCCs that are derived from a frame of sound signal concatenated with the features from a previous four frames for a total of 195 features has been found to optimally enable environment classification.

The processor 104 inputs the composite feature vector to a pattern classifier (e.g., deep learning classifier). The pattern classifier may use a Deep Neural Network (DNN) as a learning architecture for classifying the spatial environment as open or enclosed. For example, a DNN may be implemented with five hidden layers and each layer having 256 neurons with an Adam optimizer.

FIG. 9 shows an example of the testing accuracy of a DNN classifier. The testing accuracy is shown for various vectors of features input to a trained DNN. The composite feature vector formed using features extracted from the SEIR and MFCC-based features given the highest accuracy at 99.9%. Comparatively, the SEIR-only nine-dimensional vector has an accuracy of 78.5% and the MFCC 65-dimension vector has an accuracy of 79.3%. The MFCC, delta MFCC and double delta MFCC vector of 195 features has an accuracy of 96.3%.

In an embodiment cepstral mean subtraction (CMS) may be used to compensate signals for different microphone characteristics used in different devices. The average cepstrum of the frames chosen according to the energy ratio criterion may be obtained over various ambient sound recordings on the microphone or microphone array of a device. This average or mean cepstrum represents the microphone characteristics and is subtracted from the cepstrum of the individual input frames from the test signals. The cepstrum obtained after subtraction of the cepstrum mean is used to obtain the MFCC-based features that are provided as inputs to the DNN. When cepstral mean subtraction is performed on MFCC-based features, the accuracy is improved particularly when there is a mismatch between training and testing conditions due to differences in microphone transducer characteristics.

In an embodiment, the context of open or enclosed spatial environment of the device 100 may be augmented with context derived from other sensors of the device 100 thereby aiding in the overall context awareness of the user.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   detecting, by one or more microphones, ambient sound in a spatial environment;
   outputting, to a processor, an audio signal representative of the ambient sound;
   determining, by the processor, a spatial environment impulse response (SEIR) for the audio signal;
   extracting one or more features of the SEIR; and
   classifying, by a pattern classifier executed by the processor, the spatial environment as open or enclosed based on the one or more features of the SEIR.

2. The method of claim 1, wherein:
   determining the SEIR for the audio signal includes:
      performing a deconvolution on the audio signal; and
      determining a cepstrum for the deconvoluted audio signal;
   the method comprises:
      augmenting the one or more features of the SEIR with features extracted from Mel-Frequency Cepstral Coefficients (MFCCs), delta MFCCs or double delta MFCC to form a composite vector; and
   classifying the spatial environment as open or enclosed includes:
      classifying the spatial environment as open or enclosed based on the composite vector.

3. The method of claim 1, wherein classifying the spatial environment as open or enclosed includes identifying a type of the spatial environment as office, home, mall, supermarket, street, stadium, beach or nature.

4. The method of claim 1, wherein determining the SEIR for the audio signal includes:
   dividing the audio signal into a plurality of frames;
   determining an energy ratio for each frame of the plurality of frames;
   selecting, from the plurality of frames, a set of frames having respective energy ratios that meet a criterion;

performing exponential windowing on the set of frames to minimize phase;
determining a cepstrum for the set of frames; and
performing inverse exponential windowing on the set of frames.

5. The method of claim 1, wherein extracting the one or more features of the SEIR includes:
obtaining a first SEIR feature of the one or more features as energy of multiple bands of initial samples of the SEIR; and
obtaining a second SEIR feature of the one or more features as an average of maxima indices of SEIR magnitude.

6. The method of claim 5, wherein extracting the one or more features of the SEIR includes:
obtaining a third SEIR feature of the one or more features as a time kurtosis of the SEIR;
obtaining a fourth SEIR feature of the one or more features as a spectral standard deviation at a center frequency of the SEIR; and
obtaining a fifth SEIR feature of the one or more features as a slope of samples of the SEIR.

7. The method of claim 2, comprising:
performing cepstral mean subtraction on the features extracted from the MFCC, delta MFCC or double delta MFCC to reduce mismatch between training and testing conditions.

8. A device, comprising:
one or more microphones configured to:
detect ambient sound in a spatial environment; and
output an audio signal representative of the ambient sound; and
a processor configured to:
receive the audio signal representative of the ambient sound;
determine a spatial environment impulse response (SEIR) for the audio signal;
extract one or more features of the SEIR; and
classify the spatial environment as open or enclosed based on the one or more features of the SEIR.

9. The device of claim 8, wherein the processor is configured to:
determine the SEIR for the audio signal by at least:
performing a deconvolution on the audio signal; and
determining a cepstrum for the deconvoluted audio signal;
augment the one or more features of the SEIR with features extracted from Mel-frequency cepstral coefficients (MFCCs), delta MFCCs or double delta MFCC to form a composite vector; and
classify the spatial environment as open or enclosed by classifying the spatial environment as open or enclosed based on the composite vector.

10. The device of claim 8, wherein classifying the spatial environment as open or enclosed includes identifying a type of the spatial environment as office, home, mall, supermarket, street, stadium, beach or nature.

11. The device of claim 8, wherein the processor is configured to determine the SEIR for the audio signal by:
dividing the audio signal into a plurality of frames;
determining an energy ratio for each frame of the plurality of frames;
selecting, from the plurality of frames, a set of frames having respective energy ratios that meet a criterion;
performing exponential windowing on the set of frames to minimize phase;
determining a cepstrum for the set of frames; and
performing inverse exponential windowing on the set of frames.

12. The device of claim 8, wherein the processor is configured to extract the one or more features of the SEIR by:
obtaining a first SEIR feature of the one or more features as energy of multiple bands of initial samples of the SEIR; and
obtaining a second SEIR feature of the one or more features as an average of maxima indices of SEIR magnitude.

13. The device of claim 12, wherein the processor is configured to extract the one or more features of the SEIR by:
obtaining a third SEIR feature of the one or more features as a time kurtosis of the SEIR;
obtaining a fourth SEIR feature of the one or more features as a spectral standard deviation at a center frequency of the SEIR; and
obtaining a fifth SEIR feature of the one or more features as a slope of samples of the SEIR.

14. The device of claim 9, wherein the processor is configured to:
perform cepstral mean subtraction on the features extracted from the MFCC, delta MFCC or double delta MFCC to reduce mismatch between training and testing conditions.

15. A system, comprising:
a processor; and
memory configured to store executable instructions that, when executed by the processor, cause the processor to:
receive an audio signal representative of ambient sound of a spatial environment;
determine a spatial environment impulse response (SEIR) for the audio signal;
extract one or more features of the SEIR; and
classify the spatial environment as open or enclosed based on the one or more features of the SEIR.

16. The system of claim 15, wherein the executable instructions cause the processor to:
determine the SEIR for the audio signal by at least:
performing a deconvolution on the audio signal; and
determining a cepstrum for the deconvoluted audio signal;
augment the one or more features of the SEIR with features extracted from Mel-frequency cepstral coefficients (MFCCs), delta MFCCs or double delta MFCC to form a composite vector; and
classify the spatial environment as open or enclosed by at least:
classifying the spatial environment as open or enclosed based on the composite vector.

17. The system of claim 15, wherein classifying the spatial environment as open or enclosed includes identifying a type of the spatial environment as office, home, mall, supermarket, street, stadium, beach or nature.

18. The system of claim 15, wherein the executable instructions cause the processor to classify the spatial environment as open or enclosed by at least:
dividing the audio signal into a plurality of frames;
determining an energy ratio for each frame of the plurality of frames;
selecting, from the plurality of frames, a set of frames having respective energy ratios that meet a criterion;
performing exponential windowing on the set of frames to minimize phase;
determining a cepstrum for the set of frames; and performing inverse exponential windowing on the set of frames.

19. The system of claim 15, wherein the executable instructions cause the processor to extract the one or more features of the SEIR by:
   obtaining a first SEIR feature of the one or more features as energy of multiple bands of initial samples of the SEIR; and
   obtaining a second SEIR feature of the one or more features as an average of maxima indices of SEIR magnitude.

20. The system of claim 19, wherein the executable instructions cause the processor to extract the one or more features of the SEIR by:
   obtaining a third SEIR feature of the one or more features as a time kurtosis of the SEIR;
   obtaining a fourth SEIR feature of the one or more features as a spectral standard deviation at a center frequency of the SEIR; and
   obtaining a fifth SEIR feature of the one or more features as a slope of samples of the SEIR.

\* \* \* \* \*